(12) United States Patent
Ozer et al.

(10) Patent No.: US 7,542,478 B1
(45) Date of Patent: Jun. 2, 2009

(54) SYSTEM AND METHOD FOR RATE LIMITING IN MULTI-HOP WIRELESS AD HOC NETWORKS

(75) Inventors: Sebnem Z. Ozer, Altamonte Springs, FL (US); Surong Zeng, Altamonte Springs, FL (US); Charles R. Barker, Jr., Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 716 days.

(21) Appl. No.: 11/158,737

(22) Filed: Jun. 22, 2005

Related U.S. Application Data

(60) Provisional application No. 60/583,276, filed on Jun. 25, 2004, provisional application No. 60/637,252, filed on Dec. 17, 2004.

(51) Int. Cl.
*H04L 12/413* (2006.01)
(52) U.S. Cl. .................. 370/447; 370/338
(58) Field of Classification Search ........... 370/230, 370/235–238, 443, 447, 348, 442–445; 455/337, 455/338
See application file for complete search history.

(56) References Cited

U.S. PATENT DOCUMENTS

| | | | |
|---|---|---|---|
| 5,844,905 A * | 12/1998 | McKay et al. | 370/443 |
| 5,943,322 A | 8/1999 | Mayor | |
| 6,404,756 B1 | 6/2002 | Whitehill | |
| 6,556,582 B1 | 4/2003 | Redi | |
| 6,704,316 B1 * | 3/2004 | He | 370/397 |
| 6,807,165 B2 | 10/2004 | Belcea | |
| 6,873,839 B2 | 3/2005 | Stanforth | |
| 7,075,890 B2 * | 7/2006 | Ozer et al. | 370/230 |
| 2002/0058502 A1 | 5/2002 | Stanforth | |
| 2002/0080755 A1 * | 6/2002 | Tasman et al. | 370/338 |
| 2003/0142645 A1 | 7/2003 | Belcea | |
| 2004/0203820 A1 * | 10/2004 | Billhartz | 455/452.1 |
| 2004/0258092 A1 * | 12/2004 | Sugaya | 370/474 |
| 2005/0002364 A1 | 1/2005 | Ozer | |

OTHER PUBLICATIONS

P. Karn, "MACA—A New Channel Access Method for Packet Radio," ARRL/CRRL Amateur Radio 9th Computer Networking Conf., pp. 13440, ARRL, 1990.
V. Bharghavan, et al., "MACAW: A Media Access Protocol for Wireless LANs," Computer Communication Review, vol. 24, No. 4., Oct. 1994, pp. 212-225.
C.L. Fulmer, et al., "Floor Acquisition Multiple Access (FAMA) for Packet-Radio Networks," Computer Communication Review, vol. 25, No. 4, ACM, Oct. 1995 pp. 262-273.
M. Weiser, "Some Computer Science Issues Related to Ubiquitous Computing," Comm. ACM, vol. 36, No. 7, Jul. 1993, pp. 75-85.

* cited by examiner

*Primary Examiner*—Derrick W Ferris
*Assistant Examiner*—Jose Villa
(74) *Attorney, Agent, or Firm*—Randi L. Karpinia; Joseph J. Buczynski

(57) ABSTRACT

A system and method to avoid and control the bottleneck points in multi-hop wireless ad-hoc networks is described. This is achieved by using the overheard RTS/(N)CTS information to compute a weighted combination of the node's and neighbors weighted queue size. Rate limiting factor can be distributed by using ACK messages in case RTS/CTS is not enabled while node weight values can be distributed in DATA messages. Furthermore, rate limiting is based on two metrics that eliminate the problems of drop-tail schemes. Priority levels may be used for selective rejection to provide availability for emergency and system packets.

12 Claims, 6 Drawing Sheets

SYSTEM AND METHOD FOR RATE LIMITING IN MULTI-HOP WIRELESS AD HOC NETWORKS

This application claims the benefit of U.S. Provisional Application No. 60/583,276, filed Jun. 25, 2004, and U.S. Provisional Application No. 60/637,252, filed Dec. 17, 2004, the entire content of both being incorporated herein by reference.

BACKGROUND OF THE INVENTION

1. Field of the Invention

The present invention relates to virtual Carrier Sense Multiple Access/Collision Avoidance (CSMA/CA) systems in mobile multi-hop ad-hoc networks, and relates more specifically to a rate limiting algorithm for distributed contention based transmission protocols without the need of a central controller.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

Multiple Access Collision Avoidance (MACA) is a common technique used for mobile multi-hop networks. MACA is described by P. Karn in "MACA—a new channel access method for packet radio," ARRL/CRRL Amateur Radio 9th Computer Networking Conference, pp. 134-40, ARRL, 1990. It is noted that this reference and all other references cited herein are incorporated by reference herein. The technique described in this cited reference uses reservation messages to avoid packet collisions by using request-to-send (RTS) and clear-to-send (CTS) messages. The transmission between sender and receiver consists of RTS-CTS-DATA messages. MACAW extends MACA by introducing data-sending (DS) and acknowledgment (ACK) messages to form RTS-CTS-DS-DATA-ACK message exchange and a new backoff algorithm. MACAW is further described by V. Bharghavan, A. Demers, S. Shenker, and L. Zhang in "MACAW: A media access protocol for wireless LAN's," Computer Communication Review, vol. 24, (no. 4), (ACM SIGCOMM '94 Conference on Communications Architectures, Protocols and Applications, London, UK, 31 Aug.-2 Sep. 1994.) October 1994. p. 212-25. Floor Acquisition Multiple Access (FAMA) uses a non-persistent CSMA scheme with RTS/CTS scheme. FAMA is described by C. L. Fullmer, J. J. Garcia-Luna-Aceves, in "Floor acquisition multiple access (FAMA) for packet-radio networks," Computer Communication Review, vol. 25, (no. 4), (ACM SIGCOMM '95, Cambridge, Mass., USA, 28 Aug.-1 Sep. 1995.) ACM, October 1995. p. 262-73. The IEEE 802.11 MAC is a variation of CSMA/CA protocol that implements both carrier sensing and virtual (RTS-CTS exchange) carrier sensing with acknowledgment messages to improve reliability.

In addition to these messages, the negative-clear-to-send (or not-clear-to-send) (NCTS) message was introduced as an extension to MACA to be used by a central controller such as a base station, to manage the allocation of bandwidth to mobile terminals that require bandwidth guarantees for real-time multimedia data. NCTS is discussed by M. Weiser in "Some Computer Science Issues Related to Ubiquitous Computing," Comm. ACM, V 36, N 7, July, 1993, pp. 75-85. U.S. Pat. No. 6,404,756 discloses NCTS being used to indicate insufficient signal quality for the requested data rate and insufficient priority for the current message transmission.

U.S. Patent Application No. 20030142645 discloses the use of NCTS for a time division protocol in an ad-hoc network. U.S. Pat. No. 6,556,582 describes a method to avoid multiple access collision in a MACA based wireless network. Unlike the present invention, the collision avoidance scheme is proposed for a system with multiple transceivers, i.e., data channel and reservation channel transceivers. Since the transceivers work simultaneously, NCTS messages are used to inform other nodes that the intended destination node is busy at the current time.

The method described in U.S. Pat. No. 6,556,582 includes also using a priority field in RTS messages. However, processing of this information is based on an absolute comparison, that is, the relative status of the transmissions in the neighborhood is not used.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
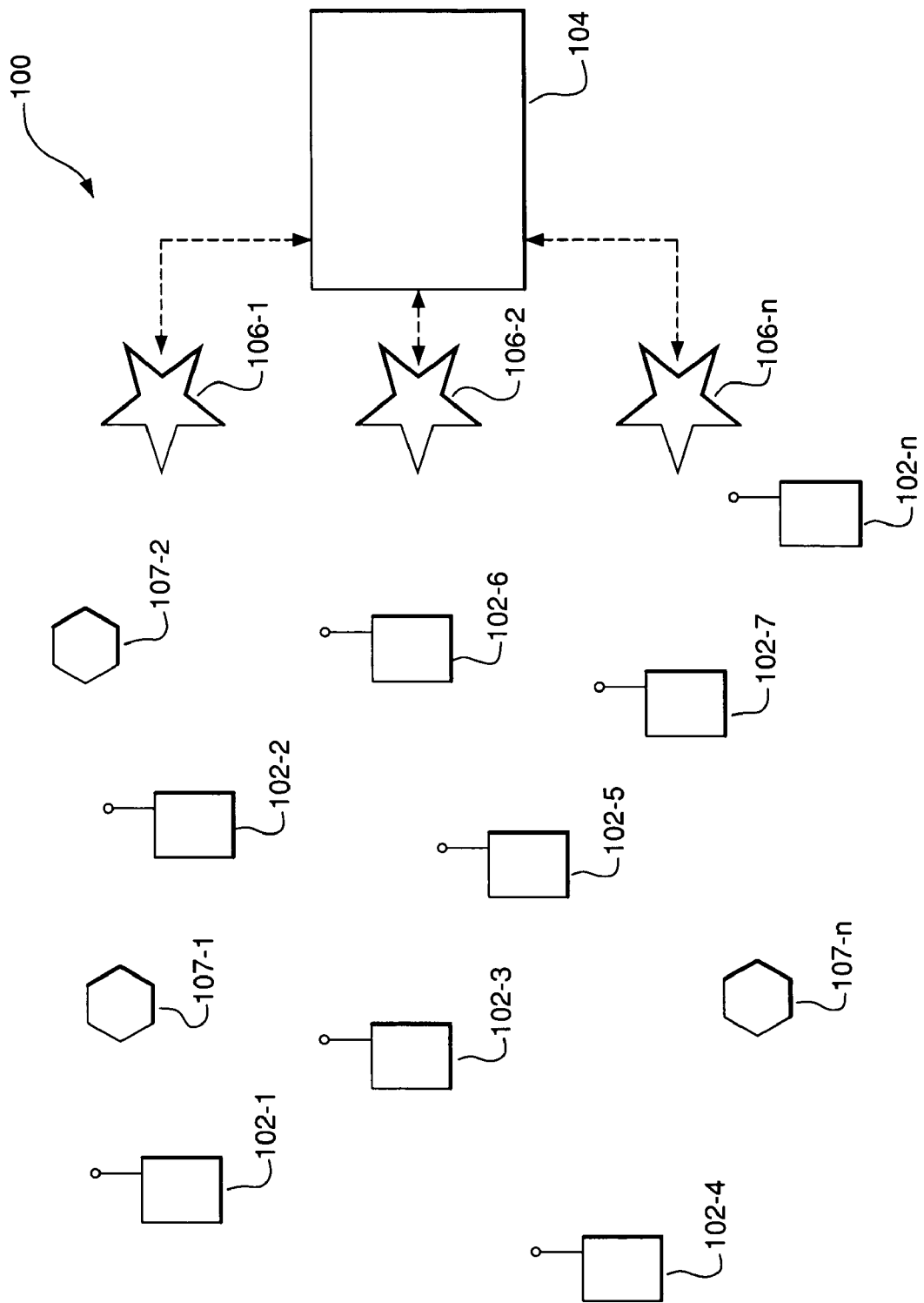
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106, or 107 operating as a router or routers for packets being sent between nodes, as described in U.S. Pat. No. 5,943,322 to Mayor, and in U.S. Pat. Nos. 7,072,650, 6,807,165 and 6,873,839, referenced above.

Figure 2:
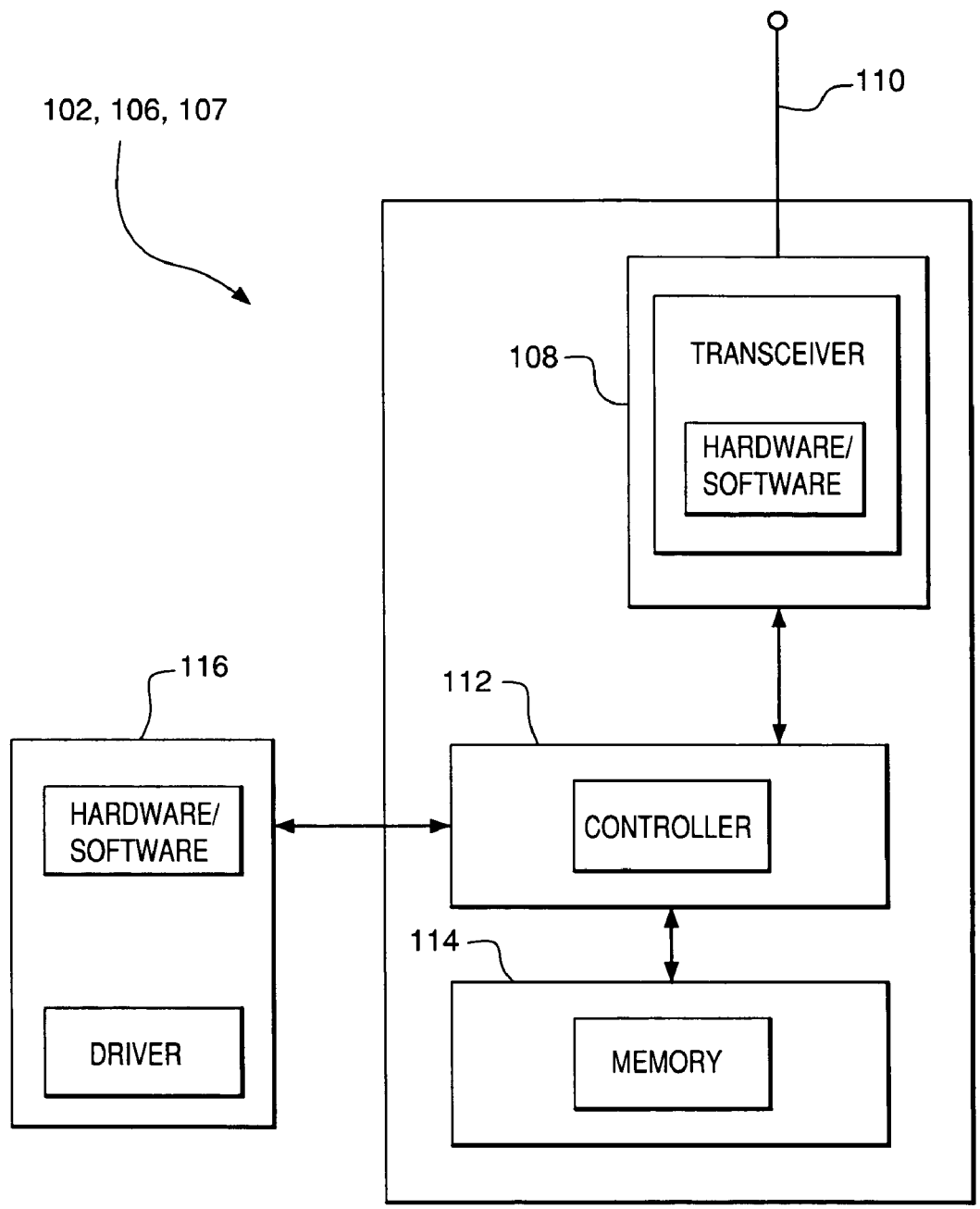
FIG. 2 is a block diagram illustrating an example of a mobile node employed in the network shown in FIG. 1.

As shown in FIG. 2, each node 102, 106, and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As will now be described, the present invention proposes a system and method to avoid and control the bottleneck points in multi-hop wireless ad-hoc networks. This is achieved by using overheard RTS/(N)CTS information to compute a weighted combination of the node's and neighbors weighted queue size. Furthermore, rate limiting is based on two metrics that eliminate the problems of drop-tail schemes. Priority levels may be used for selective rejection to provide availability for emergency and system packets.

This invention further provides a rate limiting algorithm for distributed contention based transmission protocols without the need of a central controller. One of the major issues related to this type of communication protocol is the lack of efficient, robust and fair scheduling of multimedia data with different Quality of Service (QoS) requirements. The dynamic nature of these networks causes inefficiency in scheduling and routing protocols as the wireless nodes do not have complete and up-to-date information about the network's end-to-end status to detect the bottleneck points. Furthermore, hidden nodes and miss of reservation information worsen the problem. The invention described herein proposes to compute a congestion metric related to the queue status of the nodes to provide a distributed, stateless admission control and rate limiting mechanism. These mechanisms are applied at Layer 2 (L2) of the source, destination, and forwarding nodes. The metric can also be used as a congestion metric for route selection to relieve bottleneck points. The proposed scheme can be used in one-hop or multihop ad-hoc and infrastructure networks with or without central controllers.

The present invention further provides a traffic control mechanism applied on a per hop basis by using RTS, CTS, and NCTS messages, and does not require a central controller. Furthermore, the system can be used to support service differentiation rather than to guarantee QoS requirements of a specific packet. Especially, in multihop networks the relaying nodes may send the lower priority traffic before the higher priority packets, depending on the status of the next hop for the higher priority data. Rejecting or delaying further the lower priority data in this case would cause starvation of low priority traffic and would result in throughput degradation.

U.S. Patent Application No. 20030142645 discloses the use of NCTS for a time division protocol in an ad-hoc network. U.S. Pat. No. 6,556,582 describes a method to avoid multiple access collision in a MACA based wireless network, in which the collision avoidance scheme is proposed for a system with multiple transceivers, that is, data channel and reservation channel transceivers. Since the transceivers work simultaneously, NCTS messages are used to inform other nodes that the intended destination node is busy at the current time. The embodiments of present invention described herein overcome the problems related to having one transceiver and possibly multiple data channels, such as missing reservation data.

The method described in U.S. Pat. No. 6,556,582 includes also using a priority field in RTS messages. However, processing of this information is based on an absolute comparison. On the contrary, as will now be described, the present invention provides a system and method that can estimate the congestion level at the corresponding node and its neighborhood over a time span greater than a packet transmission time. The estimated congestion level is used to slow down the upcoming traffic (not the ongoing packet transmission) by using RTS-CTS messages. NCTS messages are used only when the bottleneck can not be relieved by rate limiting (such as persistent link failure cases).

The present invention further improves MACA type systems by adding rate limiting capabilities at Layer 2. The multihop network considered in the embodiment of this description is as the following.

The sender sends a request-to-send (RTS) message to reserve the transmission medium. The receiver replies with a clear-to-send (CTS) message. RTS and CTS messages are transmitted through reservation channel while data and acknowledgment (ACK) messages may be transmitted via a selected data channel or the same reservation channel. Every node that hears RTS and/or CTS sets the corresponding addresses and channels as busy for the amount of time required for the transmission. The channel access times and the access attempts for a next hop are calculated according to the relative priority levels.

In the RTS/CTS, neighbor status information is carried. Unicast RTS carries source (i.e. the node that transmits the RTS) and next hop's MAC addresses, current packet length, packet's priority level (may be user/system priority or a combination of precedence including QoS level, user priority, retransmission attempts, packet age etc.), data channel rate, and suggested data channels. CTS carries next hop's MAC addresses, current packet length, packet's priority level, data channel rate, and selected data channel. Optionally CTS can also carry the source (i.e. the node that transmits the CTS) address.

In the present invention, in addition to the fields described above, RTS includes weighted queue size and a flag that indicates if the packet's final destination is the next hop (if multiple packets are concatenated to form MAC frames, the final destination flag can be determined by checking the final destination of each packet), while CTS includes weighted queue size and rate limiting factor. (Weighted queue size, or length, provides a metric that may consist of the priority levels, number of attempts, age, etc. of the packets stored in the corresponding node's queue. In its simplest case (where only priority level=1 is considered), this is equal to the number of packets in the queue, i.e. queue size.) Furthermore, NCTS is used to carry next hop's MAC addresses, current packet length, packet's priority level, requested data channel rate, and weighted queue size of this node (the last field may be omitted as NCTS corresponds to the highest level of weighted queue size). Optionally NCTS can also carry the source (i.e. the node that transmits the NCTS) address.

The present invention proposes an effective way to slow down and reject the nodes requesting their data to be forwarded by using the additional messages and fields only when the forwarding user's performance degradation due to forwarding other data becomes unacceptable. It may be desirable to apply this rule only if the request is not for an emergency traffic message or a system message.

In a mobile ad-hoc network, the congestion level at a relaying node is a function of the traffic that this node forwards (and/or sources) and the traffic that its neighbors transmit that does not pass from this node. Furthermore, the relaying node's processing power, bandwidth share, mobility pattern and next hop availability affect the congestion level. The statistics of the congestion metric depend on the dynamic behavior of the nodes, channel and traffic characteristics.

A desired property is to avoid the congestion before it degrades the performance of the system dramatically. Depending on the dynamic nature of the system, the congestion may span over different time scales. Therefore, estimation of this time scale is crucial. For example, if the congestion at a relaying node is persistent, an admission scheme based per packet would not be desirable. A receiver in this case would receive many RTSs and send NCTSs for each packet, hence wasting bandwidth and creating more congestion. Another important point is the capability to compare the congestion level of the next hop with the sender's traffic request (QoS and traffic characteristics). For example, for a given congestion level of the next hop, one sender's traffic would tolerate the delay, another sender's traffic would require changing the route, while another sender's traffic (such as emergency services) would preempt other traffic if the congestion is due to high traffic load. Although these desired properties of a congestion avoidance and control mechanism are hard to achieve, the scheme should be simple in order to timely reply without increasing the processing overhead.

Furthermore, contention overhead is an important factor. Rejecting a packet of a sender node that has accessed the reservation channel and sent RTS successfully is not efficient. Adjusting the access attempts of the sender nodes is a more efficient way to limit the traffic. Moreover, the sender does not always have a complete view of the network. Therefore, the embodiments of the present invention described herein employ a receiver-assisted scheme that depends on two different metrics as described below. Furthermore, multiple thresholds (similar to random early detection (RED) mechanisms) are used with these metrics to avoid problems related to drop-tail schemes and to keep the connectivity and availability for emergency and system messages.

The weighted queue length at each node is computed as the summation of the weights of the packets in the transmit queue of this node. (Weighted queue size is described in U.S. Pat. No. 7,075,890, entitled "System And Method To Provide Fairness And Service Differentiation In Ad-Hoc Networks," issued on Jul. 11, 2006 and assigned to the assignee of this invention). A packet weight may be a weighted combination of different factors such as precedence, number of attempts, delay (age), packet size, transport protocol, burstiness of the flow (if flow information is available) etc. The aggregation of the packet weights is used as an indication of the node's congestion level, e.g. how busy the node is, how busy it will be in the near future, how important (prioritization level) its traffic is. Furthermore, since the quantized weight value is distributed via RTSs the neighbors can measure the congestion level of their neighborhood. Since the bandwidth is shared, actual congestion level depends on both the node and its neighbors' activity levels.

Every node computes the forwarding neighbors' (neighbors that forward through this node) weight value (fw_nb_weight) by using the weight information distributed via RTSs. Note that this weight value may include packets that will not be forwarded to the corresponding node. However, it provides neighborhood activity level that affects reservation channel use. Depending on the routing mechanism, this scheme can be modified to distribute the weight per next hop (if the next hop for every packet in the queue is known for that time). However, routes can be changed anytime in multihop ad-hoc networks.

In an ad-hoc mode, each node can be a forwarding node. Therefore, some of the packets that this node receives are for this node's host while some are to be forwarded to other nodes. If the final destination of the packet is this node's host, in most cases it is desirable to receive the packet as soon as possible instead of delaying it. This is achieved by putting a flag in the RTS message to determine if the receiver is the final destination.

Since the nodes that source traffic can also forward other nodes' traffic, it may be desirable to avoid degradation of the originating traffic by giving higher precedence to it. This differentiating metric can also be used for route selection purposes in order to prefer idle nodes to relay traffic.

The following pseudo codes describe additional functions of a MACA type system to implement the invention. These examples to control the congestion in mobile ad-hoc networks may be extended by using the basic ideas provided in this document.

Sending RTS

The additional functions of a node that sends a RTS are:
Put the weighted queue length in the RTS.
Check if the next hop is the final destination for this packet and set the final destination field accordingly.
Receiving Intended RTS The additional functions of a node that receives a RTS intended for this node are:
Update the forwarding neighbors' activity (ave_fw_nb_weight) by using the weight field (fw_nb_weight) in the received RTS. It may be computed as:

$$\text{ave\_fw\_nb\_weight}(t) = (1-\lambda^{\Delta t})\text{fw\_nb\_weight}(t) + \lambda^{\Delta t} \text{ave\_fw\_nb\_weight}(t-\Delta t)$$

where fw_nb_weight is set to RTS weight value, $\Delta t$ is the last time ave_fw_nb_weight was updated, and $\Delta t$ is a factor.
Update the last time that forwarding neighbor's activity is updated by setting to current time
Check if this is the final destination for this packet
The information collected from RTSs is used to slow down or reject forwarding nodes as described below.
Sending CTS/NCTS The receiver nodes reject any packet if its queue size has reached a certain value. The queue size may have a hard limit (depending on the maximum buffer size) or a soft configurable limit. For example, multiple thresholds can be used to reject forwarding traffic such as one threshold for non-emergency and non-system traffic and one threshold for all the traffic.

To differentiate the source traffic from the forwarding traffic (e.g., nodes that source and forward traffic), every node can compute its own weight value (own_weight) from the priorities of the packets originated from this node and forwarding weight value (fw_weight) from the priorities of the packets to be forwarded. A secondary weight value can be kept for this purpose as $$\text{dif weight}(t) = \alpha \text{fw\_weight}(t) + (1-\alpha)\text{own\_weight}(t)$$

where weight(t)=fw_weight(t)+own_weight(t).

This differentiation is used only for rate limiting purposes, i.e. slowing down the forwarding traffic. The weight values (weight(t)) distributed via RTSs are not differentiated; therefore the internode scheduling is not affected.

The receiver node slows down the forwarding nodes if its weight and the weight (ave_fw_nb_weight) of the neighbors that forward to it are high. This metric may be computed as:

$$\text{total\_weight}(t) = \beta \text{ave\_fw\_nb\_weight}(t) + (1-\beta)\text{dif weight}(t)$$

where $\beta$ is a factor value.
The additional functions of a node that receives a RTS intended for this node and sends CTS/NCTS are:
If the queue size is larger than a predetermined threshold TH_1 then
  Send NCTS
Else if the queue size is larger than a predetermined threshold TH_2<TH_1 then
  If this is the final destination for this packet or it is an emergency traffic or system message then
    If the total_weight is greater than a predetermined threshold then
      Send CTS with a slow down factor greater than 1
    Else
      Send CTS with a slow down factor equal to 1 (no slow down)
  Else
    Send NCTS
Else
  If the total_weight is greater than a predetermined threshold then
    Send CTS with a slow down factor greater than 1
  Else
    Send CTS with a slow down factor equal to 1 (no slow down)
Receiving Intended CTS
If slow down factor field is greater than 1
Update the transmission interval for this node (that states the busy status of the next hop) according to the slow down factor
Update the link status accordingly
Note that since the nodes can adjust their channel access times, the slow down factor will affect these values differently for nodes with different weights. For example, maximum slow down factor can be different for different weight ranges.
Receiving Intended NCTS
Update the transmission interval for this node (that states the busy status of the next hop) accordingly.
Update the links status accordingly
Receiving Unintended RTS Update the neighbors' activity by using the weight field in the received RTS. The neighborhood activity value may be computed as:

$$\text{ave\_un\_nb\_weight}(t) = (1-\lambda^{\Delta t})\text{un\_nb\_weight}(t) + \lambda^{\Delta t} \text{ave\_un\_nb\_weight}(t-\Delta t)$$

where $\Delta t$ is the last time ave_un_nb_weight was updated.
Update the last time that neighbor's activity is updated by setting to current time
If the neighbors' activity and forwarding neighbors' activity are larger than a predetermined threshold, update the waiting interval for transmission attempts accordingly.
If this neighbor's activity is larger than a predetermined threshold, update the transmission interval for this node (that states the busy status of the next hop) accordingly.
Receiving Unintended CTS
If slow down factor field is greater than 1
Update the transmission interval for this node (that states the busy status of the next hop) according to the slow down factor.
Update the links status according to the slow down factor
Receiving Unintended NCTS
Release the address busy time for the sender and the receiver and add a random time (random time for the NCTS sender is longer).
Update the links status accordingly.

Figure 3:
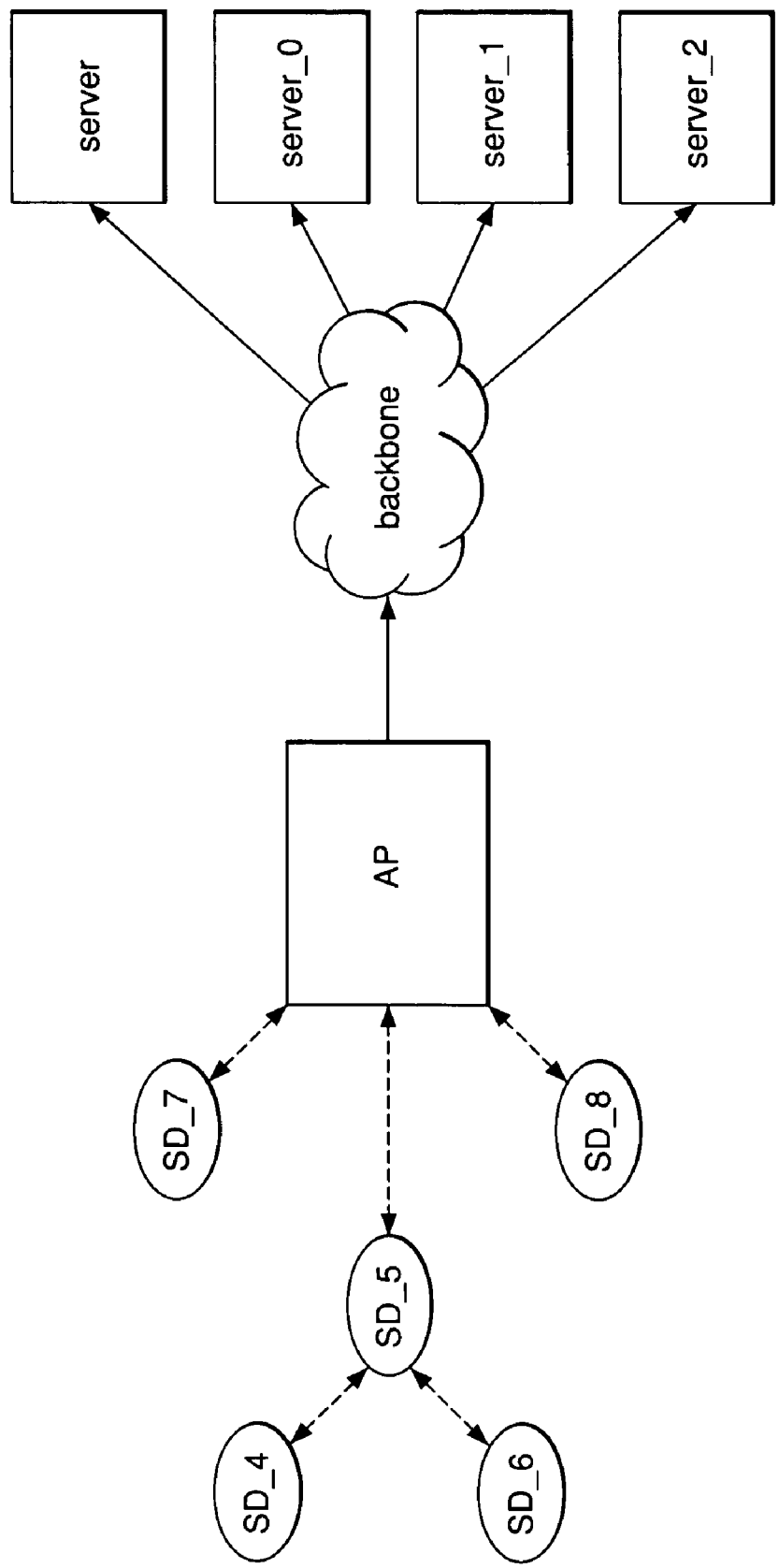
FIG. 3 is a block diagram of an example ad-hoc wireless communications network including a plurality of nodes employing a system and method in accordance with an embodiment of the present invention.

The benefit of the invention is demonstrated using an embodiment scenario as displayed in FIG. 3. The arrows show the communications links for the application packets. There are six mobile nodes and one access point (AP). Four nodes (Sd_4, Sd_6, Sd_7, Sd_8) communicate with four servers in the backbone.

The source-destination pairs are given in Table 1.

TABLE 1

| | | | Traffic streams | | | | |
|---|---|---|---|---|---|---|---|
| Source | Destination | Application | Packet size (bytes) | Interarrival time (sec) | On/off time (sec) | Precedence | Number of hops to AP |
| Sd_4 | server_2 | Video streaming (UDP) | 1460 | 0.008 | NA | 1 | 2 |
| Sd_6 | server | Voice (UDP) | 16 | 0.02 | 1/1.3 | 6 | 2 |
| Sd_7 | server_0 | Video streaming (UDP) | 1460 | 0.008 | NA | 0 | 1 |
| Sd_8 | server_1 | Video streaming (UDP) | 1460 | 0.008 | NA | 1 | 1 |

The video streaming is from mobile nodes to the servers. The voice application is bidirectional. The original MACA type system and the modified scheme are compared. There are one reservation channel and three data channels with data rate 6 Mbps. The queue is partitioned to eight classes and weighted round robin is applied. Each class queue has a weight value computed by using precedence, number of attempts and delay (age) weight factors. As described above, the receiver sends an adjustment factor via CTS depending on the moving average weight value and its own queue size. The sender adjusts the channel and next hop access times upon reception of a CTS (which will affect next transmission). If the receiver's queue size exceeds a predetermined threshold (e.g. equivalent to 20 MTU size packets), the receiver sends NCTS. The sender adjusts its transmission attempt times upon reception of an NCTS. The sender has different maximum access delays depending on its own weight value.

Figure 4:
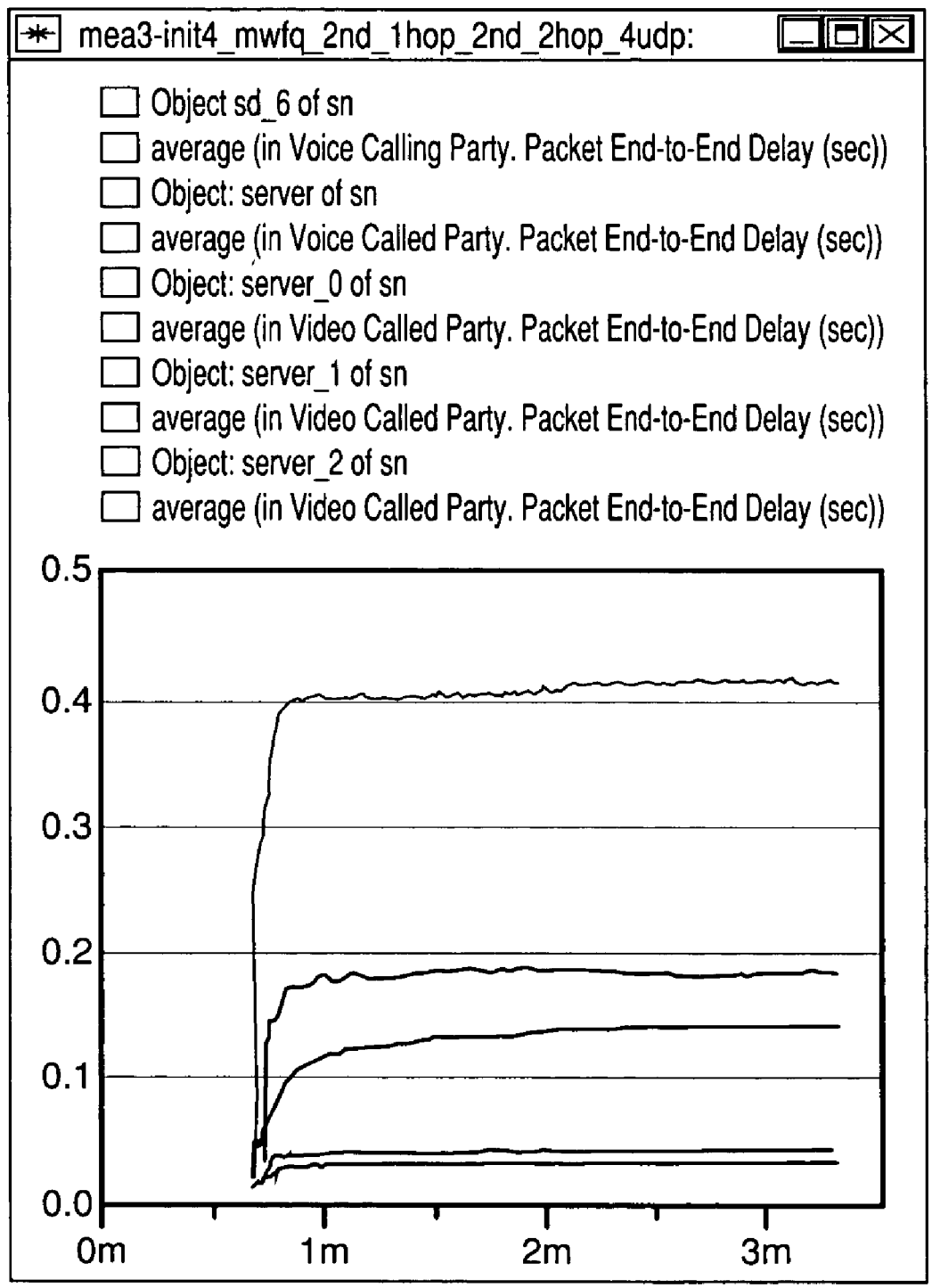
FIG. 4 is a graph displaying end-to-end delay for voice and video users according to a system and method in accordance with an embodiment of the present invention.
Figure 5:
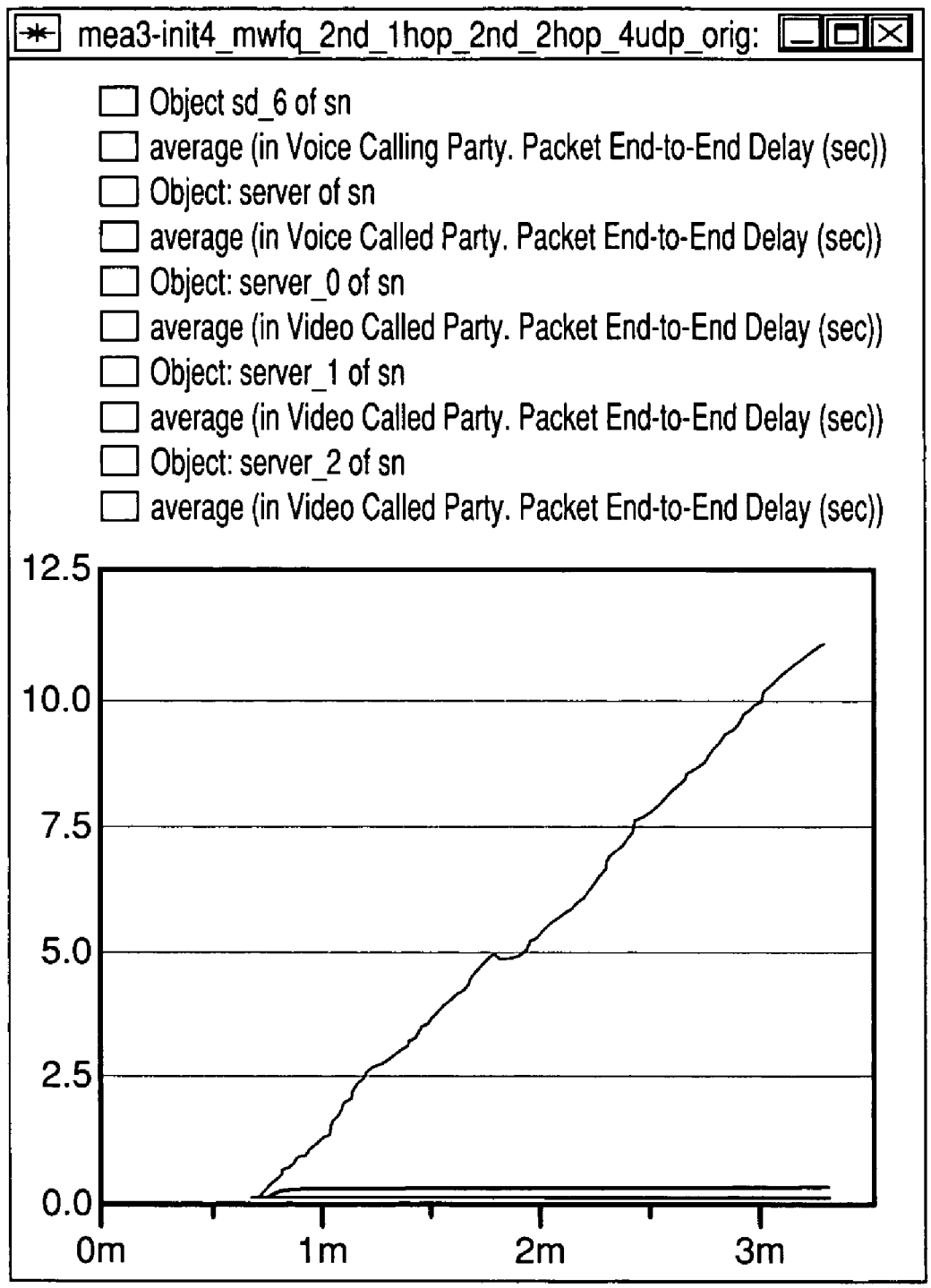
FIG. 5 is a graph displaying end-to-end delay for voice and video users according to a prior MACA type system.

FIGS. 4 and 5 display end-to-end delay for voice and video users. FIG. 4 shows the delay for the modified scheme while FIG. 5 shows the delay for the original scheme. The applications use UDP as transport protocol with no rate control. However, the drawbacks of the lack of rate control are also observed when the number of nodes that forwarding nodes and AP serve is high.

Figure 6:
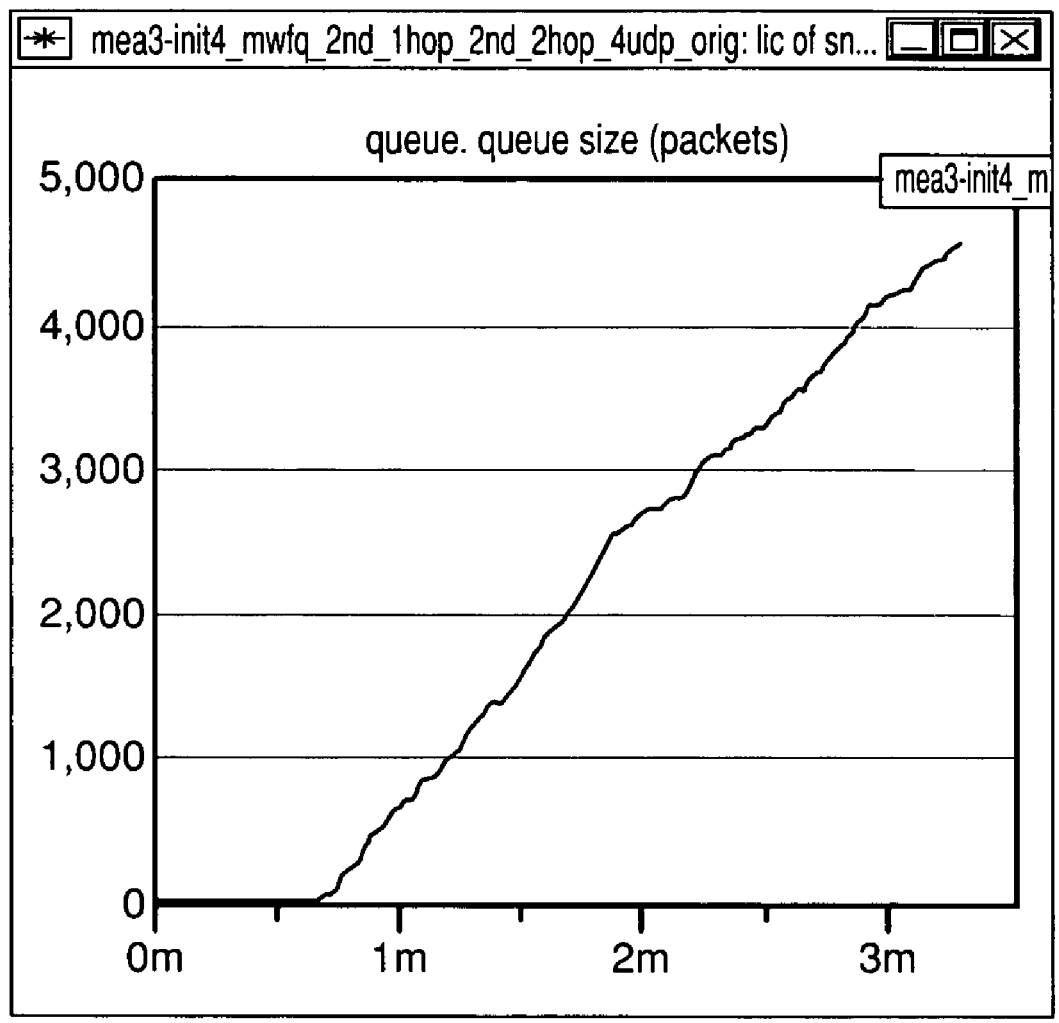
FIG. 6 is a graph displaying queue size at a forwarding node.

FIG. 6 displays queue size at the forwarding node. Since the offered load exceeds the capacity and in the original scheme there is no rate control and no packet time-to live computation, forwarding node's service time (forwarding traffic to the AP) is smaller than the arrival rate (receiving traffic from sourcing nodes), which leads to instability. In this case, the bottleneck link is between the forwarding node and the AP. Since the links between sourcing nodes and the forwarding node are good, forwarding node's queue accumulates a lot of packets in short time. Furthermore, since there are multiple data channels, forwarding node misses the AP reservation channel communication while it is busy with transmissions to the mobile nodes. Rate limiting avoids increasing the congestion level at the forwarding node and allows the nodes that use it as a next hop to update their link status in short time so that routing or application level controls can be initiated without further delay.

Possible modifications of the present invention include using the proposed congestion metric for optimal routing and load balancing. Flow or link based rate limiting and admission control can be implemented if the weight values are kept per link or per flow. Furthermore, ACK can be used to distribute congestion related data if it is sent through the reservation channel in order to implement rate limiting algorithm for cases where RTS/CTS is not used. If RTS/CTS is not enabled, the weight and final destination information may be carried in the DATA message (which is from the transmitter to the receiver). The receiver can send the slow-down factor via ACK message (which is from the receiver to the transmitter). For example, there may be two sets of slow down factors carried in the ACK messages. The first value would be equivalent to slow-down in CTS messages while the second one would further slow-down (or stop for a while) the other upcoming traffic, which would be similar to NCTS in the rate limiting algorithm.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for rate limiting in a wireless ad-hoc network, comprising:
    operating a node in the wireless ad-hoc network to determine a weighted queue size of its transmit queue;
    operating the node to send a request-to-send message including information regarding the weighted queue size;
    operating a receiving node that receives the request-to-send message to send a clear-to-send message in reply, with the clear-to-send message comprising information pertaining to a weighted queue size for a transmit queue of the receiving node; and
    operating a receiving node that receives the request-to-send message to send a not-clear-to-send message in reply, with the not clear-to-send message comprising information pertaining to the weighted queue size for the transmit queue of the receiving node.

2. The method of claim 1, wherein the request-to-send message further comprises information indicating whether the intended receiver of the message is the final destination of a packet.

3. The method of claim 1, wherein the step of operating the node to determine the determining weighted queue size comprises computing a summation of weights of packets in the transmit queue of the node.

4. The method of claim 1, wherein the clear-to-send message includes information regarding a rate limiting factor.

5. The method of claim 1, further comprising:
    operating the node to determine a weighted queue size of a transmit queue of at least one neighboring node that forwards a data packet through the node.

6. The method of claim 1, further comprising:

operating the node to adjust its transmission rate depending on information pertaining to the weighted queue sizes of other nodes that the node receives in at least one of request-to-send, clear-to-send and not-clear-to-send messages from the other nodes.

7. A wireless ad-hoc network, comprising:

at least one node, operating to determine a weighted queue size of a transmit queue of the node, and further operating to send a request-to-send message including information regarding the weighted queue size;

at least one receiving node, operating to receive the request-to-send message and to send one of the following in reply;

a clear-to-send message comprising information pertaining to a weighted queue size for a transmit queue of the receiving node; and a not-clear-to-send message comprising information pertaining to the weighted queue size for the transmit queue of the receiving node.

8. The network of claim 7, wherein the request-to-send message further comprises information indicating whether the intended receiver of the message is the final destination of a packet.

9. The network of claim 7, wherein the node further operates to determine the determining weighted queue size comprises computing a summation of weights of packets in the transmit queue of the node.

10. The network of claim 7, wherein the clear-to-send message includes information regarding a rate limiting factor.

11. The network of claim 6, wherein:

the node further operates to determine a weighted queue size of a transmit queue of at least one neighboring node that forwards a data packet through the node.

12. The network of claim 6, wherein:

the node further operates to adjust its transmission rate depending on information pertaining to the weighted queue sizes of other nodes that the node receives in at least one of request-to-send, clear-to-send and not-clear-to-send messages from other nodes.

\* \* \* \* \*

UNITED STATES PATENT AND TRADEMARK OFFICE
CERTIFICATE OF CORRECTION

PATENT NO. : 7,542,478 B1  Page 1 of 1
APPLICATION NO. : 11/158737
DATED : June 2, 2009
INVENTOR(S) : Ozer et al.

It is certified that error appears in the above-identified patent and that said Letters Patent is hereby corrected as shown below:

In Column 7, Line 49, delete "dif weight(t)" and insert -- dif_weight(t) --, therefor.

In Column 7, Lines 60-61, delete "dif weight(t)" and insert -- dif_weight(t) --, therefor.

In Column 12, Line 11, in Claim 11, delete "6," and insert -- 7, --, therefor.

In Column 12, Line 15, in Claim 12, delete "6," and insert -- 7, --, therefor.

Signed and Sealed this

Twenty-first Day of September, 2010

David J. Kappos
*Director of the United States Patent and Trademark Office*